April 20, 1954   C. B. BAZZONI ET AL   2,675,882
SEISMOGRAPHIC PROSPECTING
Filed Nov. 12, 1949

INVENTORS.
CHARLES B. BAZZONI
& LACOSTE G. ELLIS
BY
ATTORNEYS.

Patented Apr. 20, 1954

2,675,882

UNITED STATES PATENT OFFICE 2,675,882

SEISMOGRAPHIC PROSPECTING

Charles B. Bazzoni, Wallingford, Pa., and Lacoste G. Ellis, Beaumont, Tex., assignors to Sun Oil Company, Philadelphia, Pa., a corporation of New Jersey Application November 12, 1949, Serial No. 126,814

8 Claims. (Cl. 181—0.5)

This invention relates to seismographic prospecting and has particular reference to the creation of proper seismic disturbances for the carrying out of seismographic reflection prospecting.

In the past it has been customary to fire in the vicinity of the surface of the ground, and generally in shot holes, relatively large quantities of explosive such as dynamite in concentrated charges. When this is done only a very small percentage of energy is actually delivered through the earth in the form of a useable disturbance. Much of the energy of the explosion is dissipated in local destruction of the surrounding earth, the elastic limit of which is exceeded through a considerable region around the charge. The failure to secure any large percentage input of useful energy was originally ascribed to the presence of the weathered layer adjacent to the surface of the ground, the assumption being that this layer would serve as an absorbing cushion so that only a minor portion of the energy would actually reach the harder, deeper rocks through which good transmission would occur. However, it was noted that the weathered layer was a quite effective conductor of seismic disturbances of small amplitude by reason of the fact that its presence involved little loss of energy reflected from deep boundaries reaching a receiver as compared with the reception of energy by a receiver located in a deep hole extending below the weathered layer. That the weathered layer is not per se any extremely poor conductor of seismic disturbances has been further demonstrated by the effective transmission of disturbances originating in the air so that the weathered layer itself would not be subjected to stresses beyond its elastic limit. The last mentioned practice, accordingly, has found favor in view of its saving of explosive for a given energy input. However, the firing of concentrated charges in air is objectionable in view of the noise and shock which such firing produces.

In accordance with the present invention more effective transmission of explosive energy into the earth is secured by the dispersal of a total charge over an area in contact with the earth so that the disruptive effects are locally minimized. In accordance with the invention the area coverage of the explosive is effected in either of two ways or by a combination of the two ways, these involving either the provision of discrete small charges located over a relatively extended area, or by the use of explosive in elongated form, for example, in the cord-like form known as primacord, which has a high rate of explosion propagation, for example 18,000 feet per second, or a combination of such progressive explosive material with discrete charges to cover an extended area.

Furthermore, in accordance with the invention, since the explosion is progressive in nature over the area, it is possible to so arrange the explosive material and/or charges as to secure directional effects for the wave front which is produced including focussing or controlled dispersion of the wave energy when desired.

The various objects of the invention will be apparent from the foregoing and from the following description read in conjunction with the accompanying drawing in which.

Figure 1:
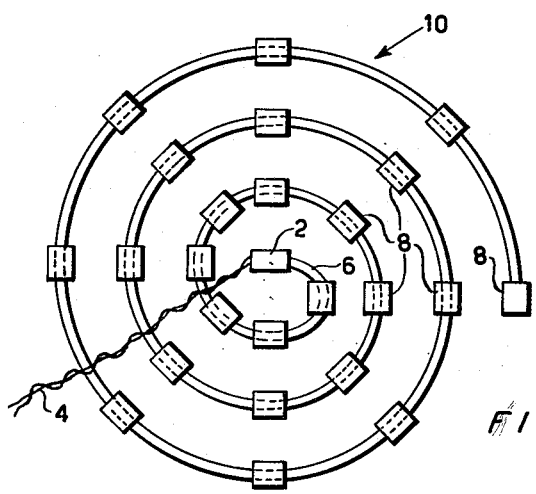
Figure 1 is a plan view illustrating one arrangement of an explosive cord-like material associated with discrete charges to cover an extended area of the ground.

Referring first to Figure 1, there is illustrated at 2 a detonator provided with the leads 4 through which it may be fired in the usual fashion. The detonator is connected to one end of a progressive explosive element 6, for example of the primacord type, which is in the form of a flexible tube containing explosive of such type that an explosion will progress along the length of the element at a very rapid rate, such as of the order of 18,000 feet per second. As illustrated in Figure 1 the element 6 is wound in the form of a spiral progressing outwardly from the detonator 2. Locally along this element 6 there are provided discrete charges of explosive 8 which may, for example, take the form of bundles of dynamite surrounding the element or sticks of dynamite merely lashed to the element. The whole array is indicated generally by the numeral 10. When the detonator is fired there occurs a progressive explosion starting from the interior of the spiral and running outwardly. The radial outward progression rate, of course, depends upon the linear rate of travel of the explosion along the element 6 and the disposition of the convolutions of the spiral with respect to each other. As will be evident, the spiral may, as generally illustrated, be of the Archimedes type or may be of a hyperbolic or logarithmic type in which the convolutions spread more and more as the radius increases or may be of a type in which the convolutions become closer as the radius increases. As will be evident, these various arrays will produce different time distributions of the initiation of the disturbance over the area covered by the array. The discrete charges at 8 will produce locally intensified sources but while these discrete charges are localized the effect at any appreciable distance below the array will be much the same as if they were distributed to form, in effect, merely a continuous element such as 6 of large size and explosive concentration.

An array such as that described has the advantage that, while local disruption of the soil does occur, this local disruption is relatively limited and the volume which is subjected to stresses beyond its elastic limit is relatively small for a given amount of explosive. The result is that the explosive energy is, in effect, fed into the earth over a relatively large area as compared with the utilization of a concentrated explosive charge of like size, in effect forming a point source with intense disruption occurring at the source. While an elongated explosive array of the type described may be sunk into a correspondingly shaped ditch and covered or may be supported in the air there is no particular point in utilizing either of these expedients and it is preferred, therefore, to place the array on the surface without covering it. When so placed the noise and shock are considerably lessened as contrasted with causing the explosion to occur in the air.

Figure 3:
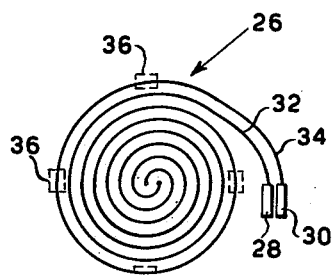
Figure 3 is a plan view similar to Figure 1 but showing an arrangement by which a wave front may be modified.
Figure 2:
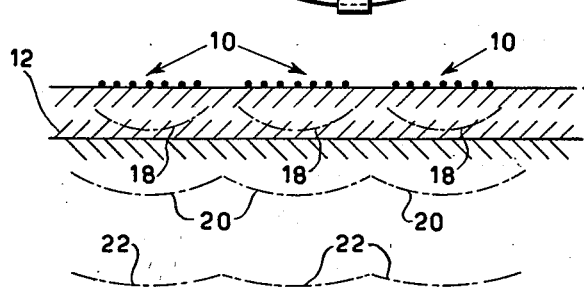
Figure 2 is a vertical section illustrating how a number of arrays, such as indicated in Figure 1, may be associated in order to secure extended area coverage.

In order to secure a well defined wave front it is desirable to associate a plurality of arrays, such as that of Figure 1, side by side as indicated in Figure 2. The arrays are here shown as located on the surface of the weathered layer 12. For reflection shooting there are, of course, provided the detectors indicated at 14 at a suitable remote location, these being connected to a conventional seismographic recorder 16. If the several arrays 10 are simultaneously fired by connection of their detonators in series there will be produced from each of them waves such as indicated at 18, 20 and 22 in Figure 2, the reflected energy from the combined wave front approaching the detectors 14 as indicated at 24. If the spiral arrays are as indicated in Figure 1 with the progress of the explosion being from the center outwardly it will be evident that the individual wave fronts of the arrays will be concave upwardly since the disturbance will start at the central part of the array and progress outwardly. The curvature of these wave fronts will, of course, decrease progressively as indicated at 20 and 22 so that at substantial distances below the surface the wave front will be approximately plane. However, it is possible to cause the wave front to be approximately plane even close to the explosive arrays. Figure 3 illustrates an array giving rise to this condition.

Figure 4:
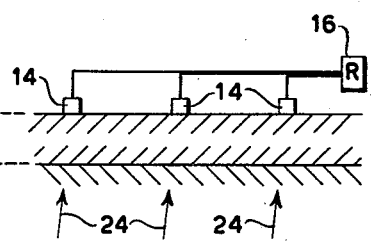
Figure 4 is a view similar to Figure 2 but illustrating the use of an explosive array such as shown in Figure 3.
Figure 4:
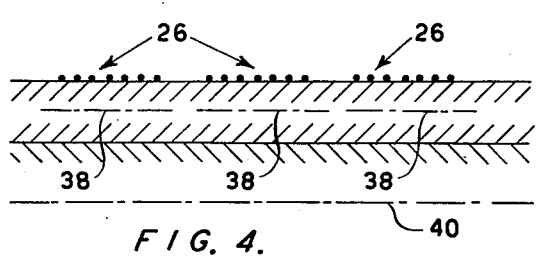

In this figure the array indicated at 26 involves a pair of detonators 28 and 30 which may be connected in series for simultaneous firing, which detonators are connected to a pair of explosive elements 32 and 34 which spiral inwardly from the detonators. As indicated, the convolutions of the two elements alternate and by this arrangement a relatively large area may be covered with a considerable inward pitch of the spirals. If desired, local charges may be provided as indicated at 36. With this arrangement wave fronts may be produced which may be slightly convex upwards in the vicinity of the arrays but rapidly become substantially plane as indicated at 38 in Figure 4 to give rise to a substantially plane wave front indicated at 40.

Figure 5:
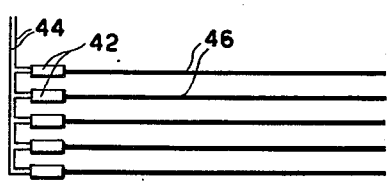
Figure 5 is a plan view showing another array of progressive explosive elements for the production of a wave front progressively sloping with respect to the vertical.
Figure 7:
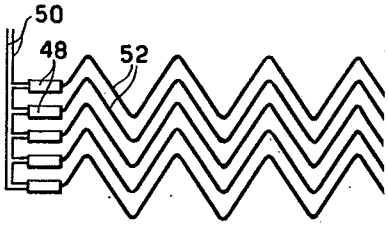
Figure 7 is a plan view similar to Figure 5 but showing still another alternative array.
Figure 6:
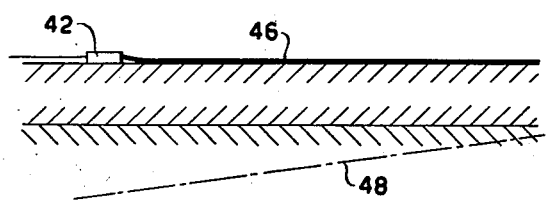
Figure 6 is a vertical section illustrating the use of the array of Figure 5.

The arrangements just described tend to produce, except for refractions which may occur at the boundaries of strata, wave fronts which move vertically downwardly. Sloping wave fronts are, however, frequently desirable in order to project the maximum energy toward a deep reflecting boundary at the proper angle to produce a maximum reflection of energy to the detectors, the considerations here involved being similar to those set forth in the application of Lacoste G. Ellis, Serial No. 83,363, filed March 25, 1949, now Patent No. 2,569,411, granted September 25, 1951. Such sloping wave fronts may be obtained utilizing the type of arrays heretofore referred to if they are located on properly sloping surfaces but it will be evident that if substantial areas are to be covered by the explosion it would generally be impractical to provide the necessary sloping surface on the earth. Preferably, therefore, there is adopted the type of arrangement illustrated in Figures 5 and 6. In this type of arrangement elongated explosive elements of the type previously referred to, indicated at 46, are laid out in parallelism or other suitable array, such as in fan shape, and are simultaneously fired by the use of individual detonators 42 connected in series as indicated at 44. Under these circumstances a wave front such as indicated at 48 will be produced having an angle relative to the surface which will depend upon the delay time of propagation of the explosion along the individual elements. The rate of propagation of such elements may be adjusted to a considerable extent by virtue of their construction and, accordingly, by this means various angles of slope of the wave front may be secured. However, the same type of variations may be even more conveniently secured by the adoption of a zig-zag array of elements 52 as indicated in Figure 7, the elements in this case also being fired by individual detonators 48 series connected as indicated at 50. By reason of the zig-zag arrangement the time delay toward the right is increased and consequently the slope of the wave front is correspondingly increased. By this arrangement, therefore, the slope of the wave front can be changed from the minimum corresponding to the arrangement of the explosive elements in straight lines up to a practical maximum represented by a zig-zag arrangement of the elements so that their adjacent waves are as close together as feasible.

It will be evident from the foregoing that two ends may be readily achieved in accordance with the invention:

First, the local intensity of the explosion may be so reduced as to produce a low and localized stressing of the underlying earth with the result that a minimum volume is subjected to stresses exceeding the elastic limit. The result is that a substantially larger percentage of the explosive energy is transformed into the travelling wave rather than merely expended in disruption of the soil.

Secondly, by taking advantage of the progressive nature of the explosion along the elongated explosive element, together with the possibility of utilizing this progressive explosion to fire localized charges there is afforded the possibility of modifying the wave front which is produced. While various illustrations of this type of procedure have been given above it will be evident that the elongated explosive elements may be disposed in many other fashions. Being of cord-like material the elements may be arranged in the form of networks so that crossing strands may ignite each other thereby giving rise to many desired patterns at the explosive source. In particular, directed wave fronts may be provided without the necessity for firing charges suspended above the surface which, as previously mentioned, are objectionable by virtue of the large shock waves produced in the air.

Focussing or directed dispersion may be effected. The discussion of Figure 3 implied its utilization over a relatively small area so that a number of the spirals described would be associated and fired simultaneously giving rise to a wave which at a substantial depth would have an approximately plane front and would be directed vertically downwardly. If, however, a spiral arrangement such as indicated in Figure 3 covers a very considerable area and is used alone, it will be evident that there may be produced a wave which, in effect, has converging rays so that it may be focussed, for example, to converge theoretically after reflection from a deep surface, at the location of one or more receivers. In this fashion a quite concentrated reflection of energy may be produced. Furthermore, it will be evident that if the spiral is suitably distorted it may not only have such focussing effects but additionally may be given a directive effect similar to that described with reference to Figures 5, 6 and 7. In such cases the ignition may be started from several points connected also by primacord and, for example, with this last primacord extending transversely to the arcs of the spiral. Rectangular or other arrays may also be used with suitable ignition points to produce any desired type of wave having directive and/or focussed properties. It will, of course, be obvious that an optical analogy may only be approximated in view of the presence of numerous reflecting and dispersing boundaries in the earth. However, substantial directive effects may be secured along with substantial concentrations of energy where that is desired. By adopting reversely arranged arrays it is, of course, possible to produce expanding waves which, in some cases, may be useful to reach remote receivers.

As will be evident, the invention may be applied to prospecting over water covered areas by supporting a desired array of the cord-like explosive material on or adjacent to the surface by buoyant floats.

What is claimed is:

1. The method of seismographic prospecting comprising providing through an area of the surface of the earth an array of elongated cord-like explosive involving an arrangement of the explosive in substantially spiral form to provide time displacement of explosion between the central and peripheral portions of the area, producing a progressive explosion through said area by firing said cord-like explosive and producing thereby a non-planar wave front, and detecting reflected seismic waves produced by the explosion.

2. The method of seismographic prospecting comprising providing through an area of the surface of the earth an array of elongated cord-like explosive involving an arrangement of the explosive in substantially spiral form to provide delay of explosion at the central portion of said area with respect to that occurring at the peripheral portion of the area, producing progressive explosion through said area by firing said cord-like explosive and producing thereby a wave front which is concave downwardly, and detecting reflected seismic waves produced by the explosion.

3. The method of seismographic prospecting comprising providing through an area of the surface of the earth an array of elongated cord-like explosive involving an arrangement of the expolsive in substantially spiral form to provide delay of explosion at the peripheral portion of said area with respect to that occurring at the central portion of the area, producing a progressive explosion through said area by firing said cord-like explosive and producing thereby a wave front which is concave upwardly, and detecting reflected seismic waves produced by the explosion.

4. The method of seismographic prospecting comprising providing through an area of the surface of the earth an array of elongated cord-like explosive of the type producing, on firing, a progressive explosion along its length, said array including discrete concentrated charges of explosive located at points along the length of the cord-like explosive and involving an arrangement of the explosive in substantially spiral form to provide time displacement of explosion between the central and peripheral portions of the area, producing a progressive explosion through said area by firing said explosive and producing thereby a non-planar wave front, and detecting reflected seismic waves produced by the explosion.

5. The method of seismographic prospecting comprising providing through an area of the surface of the earth an array of elongated cord-like explosive of the type producing, on firing, a progressive explosion along its length, said array including discrete concentrated charges of explosive located at points along the length of the cord-like explosive and involving an arrangement of the explosive in substantially spiral form to provide delay of explosion at the central portion of said area with respect to that occurring at the peripheral portion of the area, producing progressive explosion through said area by firing said explosive and producing thereby a wave front which is concave downwardly, and detecting reflected seismic waves produced by the explosion.

6. The method of seismographic prospecting comprising providing through an area of the surface of the earth an array of elongated cord-like explosive of the type producing, on firing, a progressive explosion along its length, said array including discrete concentrated charges of explosive located at points along the length of the cord-like explosive and involving an arrangement of the explosive in substantially spiral form to provide delay of explosion at the peripheral portion of said area with respect to that occurring at the central portion of the area, producing a progressive explosion through said area by firing said explosive and producing thereby a wave front which is concave upwardly, and detecting reflected seismic waves produced by the explosion.

7. The method of seismographic prospecting comprising providing through an area of the surface of the earth an array of elongated cord-like explosive involving an arrangement of the explosive in substantially spiral form to provide time displacement of explosion between the central and peripheral portions of the area, said array involving side by side arrangement of said explosive with detonators at corresponding ends thereof, producing a progressive explosion through said area by firing said detonators simultaneously and producing thereby a non-planar wave front, and detecting reflected seismic waves produced by the explosion.

8. The method of seismographic prospecting comprising providing through an area of the surface of the earth an array of elongated cord-like explosive of the type producing, on firing, a progressive explosion along its length, said array including discrete concentrated charges of explosive located at points along the length of the cord-like explosive and involving an arrangement of the explosive in substantially spiral form to provide time displacement of explosion between the central and peripheral portions of the area, said array involving side by side arrangement of said explosive with detonators at corresponding ends thereof, producing a progressive explosion through said area by firing said detonators simultaneously and producing thereby a non-planar wave front, and detecting reflected seismic waves produced by the explosion.

References Cited in the file of this patent

UNITED STATES PATENTS

| Number | Name | Date |
|---|---|---|
| 2,239,123 | Stoneking | Apr. 22, 1921 |
| 2,133,484 | Sherar | Oct. 18, 1938 |
| 2,340,314 | Farnham | Feb. 1, 1944 |
| 2,377,903 | Rieber | June 12, 1945 |